UNITED STATES PATENT OFFICE.

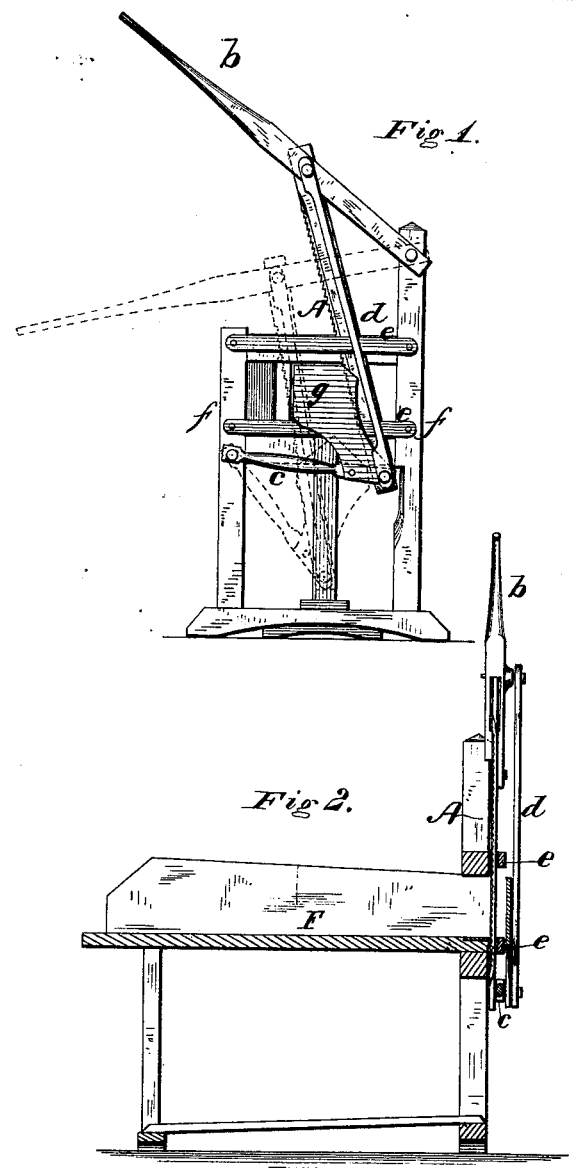

THOMAS E. MARABLE, OF PETERSBURG, VA., ASSIGNOR OF ONE-HALF HIS RIGHT TO JAMES COLEMAN BLAKE, OF SAME PLACE.

IMPROVEMENT IN STRAW-CUTTERS.

Specification forming part of Letters Patent No. 191,008, dated May 22, 1877; application filed March 30, 1877.

*To all whom it may concern:*

Be it known that I, THOMAS E. MARABLE, of Petersburg, in the county of Dinwiddie and State of Virginia, have invented a new and useful Hay and Straw Cutter; and I do hereby declare the following to be a full, clear, and exact description of the same, reference being had to the accompanying drawings, forming part of this specification, in which—

Figure 1 represents a side elevation of the straw-cutter; Fig. 2, a longitudinal vertical section of same, and Figs. 3 and 4 detail views of the cutting-blade.

Similar letters of reference in the accompanying drawings denote the same parts.

The object of this invention is to produce for the public an improved hay and straw cutting machine which shall be simple in construction, convenient of operation, cheap, and durable, and shall require less power to operate it than is required in the machines heretofore in general use for these purposes; and to this end my invention consists, first, in an improved knife, which can be more easily and perfectly sharpened than heretofore; secondly, in the re-enforcement of said knife by a bar or rod operated by the knife-handle or lever; thirdly, in the mode of supporting and guiding said knife by two arms or levers, one articulated to a support in front, and the other to a support in rear of the knife; fourthly, in combining with the knife and its supporting arms or levers a movable stop or gage, which will, when the knife rises, assume a proper position in front of the end of the feed-table, gage the length of hay to be cut, and when the knife descends will move away from said position and allow the cut hay to fall; and, lastly, in the subordinate combination and elements of construction and operation hereinafter more specifically set forth.

In the drawings, F is the feed-table; $f$, an upright frame attached to the discharge-end of the feed-table; A, the cutting-knife; $b$, the arm or lever by which the knife is operated; $c$, an arm to which the lower end of the knife is articulated; $d$, a stiff rod or bar parallel to the knife and articulated to the lever $b$ and arm $c$; $e\ e$, guide-bars behind which the knife moves, and $g$ a gage rigidly affixed to the arm $c$, and adapted to gage the length of hay or straw to be cut off by each stroke of the knife.

The knife-blade is made thin and is flat on one side and beveled or inclined on the other, the flat side being provided with small sharp inclined serrations like the edge of a sickle-blade. It can be sharpened readily by simply grinding the smooth inclined side. Although this blade is made very thin, to facilitate its operation, yet it is prevented from doubling or buckling by reason of the stiff bar which keeps it always at the proper tension. The arrangement of the bar just outside of the knife and parallel thereto prevents the bar from obstructing the operation of the machine. The attachment of the knife to the two levers or arms $b\ c$, one articulated on a pivot behind the knife-blade and the other articulated on a pivot in front of said blade, not only gives the blade a peculiar drawing cut, but causes it to pass back and forth across the end of the feed-table by a simple vertical movement of the operating-lever. When the knife is raised the gage is thereby automatically brought squarely across the passage-way of the hay or straw, forming a stop to hold the feed in the proper position for a new cut, and when the knife is brought down to cut off the feed the gage is thereby moved out of the way and the cut feed allowed to fall from the machine.

The gage may be secured to the arm by one or more rivets or other fastenings, as shown, or it may, if preferred, be adjusted upon the bar $d$ or any other rod attached to the lever $b$, whereby it will be caused to operate by the movement of said lever, and without the necessity of any guides to control its course or position.

I claim as my invention—

1. As a new article of manufacture, a knife adapted for hay and straw cutting machines, having a wide thin blade, with one side flat and serrated and the other side beveled and smooth, and provided with means for attaching it at both ends to operating arms or levers, substantially as described.

2. The combination of the knife and operating-arm $b$ with the stiff rod or bar $d$, arranged outside of the knife-blade, substantially as described.

3. The combination of the knife A and the levers $b$ and $c$, articulated to their supports on opposite sides of the knife, substantially as described.

4. The combination of the knife, levers $b$ and $c$, and stiff bar $d$, substantially as described.

5. The combination of the levers $b$ and $c$, the knife, the bar $d$, and the gage $g$, arranged between the bar $d$ and the knife, substantially as described.

T. E. MARABLE.

Witnesses:
  FRANK MCKENNY,
  MELVILLE CHURCH.